No. 766,188. Patented August 2, 1904.

UNITED STATES PATENT OFFICE.

GEORGE W. HOPP, OF OLYMPIA, WASHINGTON.

FUEL BLOCK OR BRIQUET.

SPECIFICATION forming part of Letters Patent No. 766,188, dated August 2, 1904.

Application filed December 1, 1903. Serial No. 183,381. (No model.)

*To all whom it may concern:*

Be it known that I, GEORGE W. HOPP, a citizen of the United States, residing at Olympia, in the county of Thurston and State of Washington, have invented new and useful Improvements in Fuel Blocks or Briquets, of which the following is a specification.

My invention relates to the manufacture of blocks or briquets to be used as fuel, and has for its object to provide an improved composition as a binder for the coal-dust or other material constituting the main element of the briquet that will not disintegrate or melt down under heat.

Certain other objects are accomplished by employing the several ingredients constituting my improved binder, as will be hereinafter more definitely set forth.

In forming my improved binder I employ as a base either crude mineral oil or the residuum thereof after distillation under a temperature of about 500° Fahrenheit and then combine therewith the following substances in about the proportions named: mineral oil or its residuum, eighty-five per centum; coal-tar, five per centum; rosin, one per centum; calcium carbonate, one per centum; ferric sulfate, three per centum; water, five per centum. This mixture is then subjected to a temperature of about 350° Fahrenheit and reduced to a liquid form. It is then admixed with a proper proportion of comminuted coal or other material to be used as the main element of the article, the whole being finally compressed into briquets of any desired configuration.

By employing the above-named ingredients the following advantages are obtained: The oil or oil residuum acts as a binder for the coal-dust, the coal-tar as a binder and as a coking material, the ferric sulfate as a hardening material, the rosin as a combustible, and the calcium carbonate as a smoke neutralizer.

Having thus described my invention, what I claim as new, and desire to secure by Letters Patent, is—

1. A fuel block or briquet, consisting, essentially, of coal-dust or other comminuted combustible material, a binder of mineral oil or its residuum, a binder and coker of coal-tar, a hardening material of ferric sulfate, a combustible of rosin, and a smoke-neutralizer of calcium carbonate.

2. A binder for fuel blocks or briquets, consisting of an admixture of mineral oil or its residuum, coal-tar, rosin, calcium carbonate, ferric sulfate, and water.

3. A binder for fuel blocks or briquets, consisting of an admixture of mineral oil or its residuum, eighty-five parts; coal-tar, five parts; rosin, one part; calcium carbonate, one part; ferric sulfate, three parts, and water, five parts.

In testimony whereof I have hereunto set my hand in the presence of two subscribing witnesses.

GEORGE W. HOPP.

Witnesses:
J. O. B. SCOBEY,
S. A. MADGE.